United States Patent
Yano et al.

(10) Patent No.: US 8,467,471 B2
(45) Date of Patent: Jun. 18, 2013

(54) CODING AND MODULATION SELECTING METHOD AND WIRELESS COMMUNICATION EQUIPMENT

(75) Inventors: Takashi Yano, Tokorozawa (JP); Masashi Naito, Hachioji (JP); Takehiko Kobayashi, Fuchu (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 952 days.

(21) Appl. No.: 12/554,145

(22) Filed: Sep. 4, 2009

(65) Prior Publication Data

US 2010/0080320 A1 Apr. 1, 2010

(30) Foreign Application Priority Data

Sep. 30, 2008 (JP) ................... 2008-253074

(51) Int. Cl.
*H04L 27/00* (2006.01)
(52) U.S. Cl.
USPC ........... 375/295; 375/219; 375/267; 375/299; 375/316; 375/347
(58) Field of Classification Search
USPC .................. 375/267, 299, 295, 219, 316, 347
See application file for complete search history.

(56) References Cited

U.S. PATENT DOCUMENTS

| | | | |
|---|---|---|---|
| 6,985,752 B2 | 1/2006 | Takano et al. | |
| 7,187,657 B2 | 3/2007 | Koide et al. | |
| 7,593,486 B2 | 9/2009 | Jeong et al. | |
| 7,933,340 B2 | 4/2011 | Itoh | |
| 8,218,609 B2 * | 7/2012 | Walton et al. | 375/219 |
| 2004/0120411 A1 * | 6/2004 | Walton et al. | 375/260 |
| 2004/0174840 A1 * | 9/2004 | Yano et al. | 370/328 |
| 2009/0213955 A1 | 8/2009 | Higuchi et al. | |

FOREIGN PATENT DOCUMENTS

| | | |
|---|---|---|
| JP | 2003-037554 A | 2/2003 |
| JP | 2003-143654 A | 5/2003 |
| JP | 2004-266586 A | 9/2004 |
| JP | 2005-039722 A | 2/2005 |
| JP | 2007-028569 A | 2/2007 |
| JP | 2007-508736 A | 4/2007 |
| JP | 2007-306423 A | 11/2007 |
| JP | 2007-325142 A | 12/2007 |
| JP | 2008-503144 A | 1/2008 |
| WO | 2007-089875 A2 | 8/2007 |

\* cited by examiner

*Primary Examiner* — Ted Wang
(74) *Attorney, Agent, or Firm* — Mattingly & Malur, PC

(57) ABSTRACT

Disclosed herewith is a radio communication apparatus capable of selecting proper one of plural communication modes such as a MIMO communication system so as to obtain a higher communication rate within a range in which chain retransmission occurrence is prevented. The MIMO system deciding section of the transmitter unit decides a proper MIMO system with reference to the CQI value demultiplexed by a demultiplexer and the AMC table controlling section changes the MCS value step by step according to the transmission count and the result (success/failure) of the communication. Furthermore, the AMC table controlling section updates the mean rate in the measured rate table when the subject data is received successfully or when the transmission count reaches the maximum value.

5 Claims, 26 Drawing Sheets

| CQI | MEAN RATE (STC) | MEAN RATE (SM) |
|---|---|---|
| 0 | $R_{STC}(0)$ | $R_{SM}(0)$ |
| 1 | $R_{STC}(1)$ | $R_{SM}(1)$ |
| 2 | $R_{STC}(2)$ | $R_{SM}(2)$ |
| ⋮ | ⋮ | ⋮ |
| 31 | $R_{STC}(31)$ | $R_{SM}(31)$ |

$$R_{STC}(i) = \frac{\text{TOTAL BITS SENT SUCCESSFULLY IN STC MODE AT CQI}=i}{\text{TOTAL TIME REQUIRED FOR STC MODE TRANSMISSION AT CQI}=i}$$

$$R_{SM}(i) = \frac{\text{TOTAL BITS SENT SUCCESSFULLY IN SM MODE AT CQI}=i}{\text{TOTAL TIME REQUIRED FOR SM MODE TRANSMISSION AT CQI}=i}$$

FIG. 5

| CQI | AMC TABLE (STC) | AMC TABLE (SM) |
|---|---|---|
| 0 | $MCS_{STC}(0)$ | $MCS_{SM}(0)$ |
| 1 | $MCS_{STC}(1)$ | $MCS_{SM}(1)$ |
| 2 | $MCS_{STC}(2)$ | $MCS_{SM}(2)$ |
| ⋮ | ⋮ | ⋮ |
| 31 | $MCS_{STC}I(31)$ | $MCS_{SM}(31)$ |

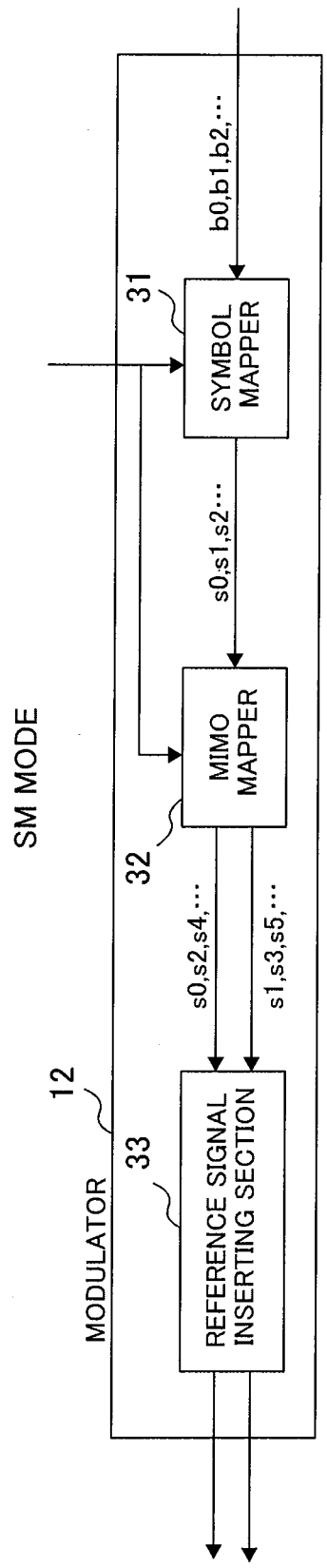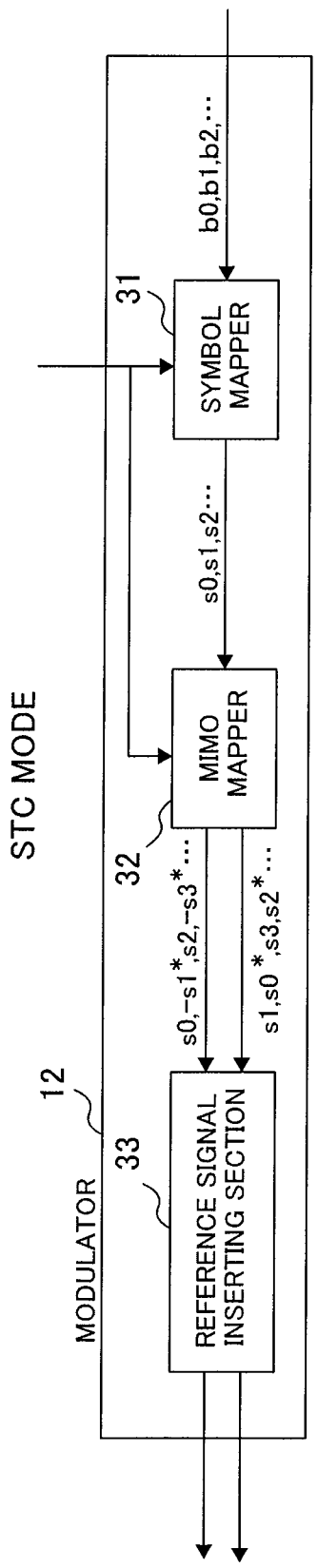

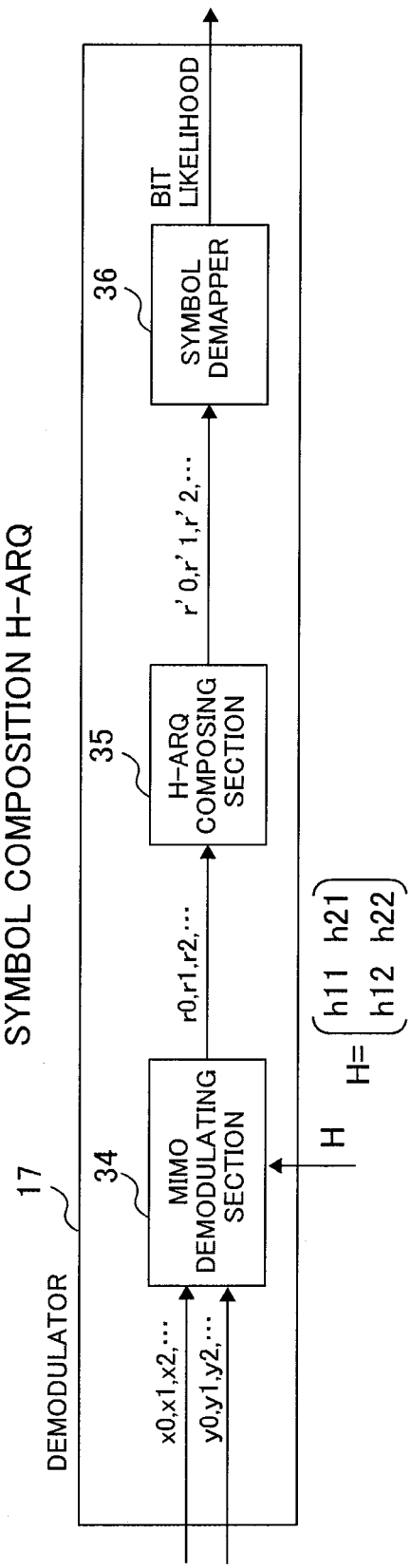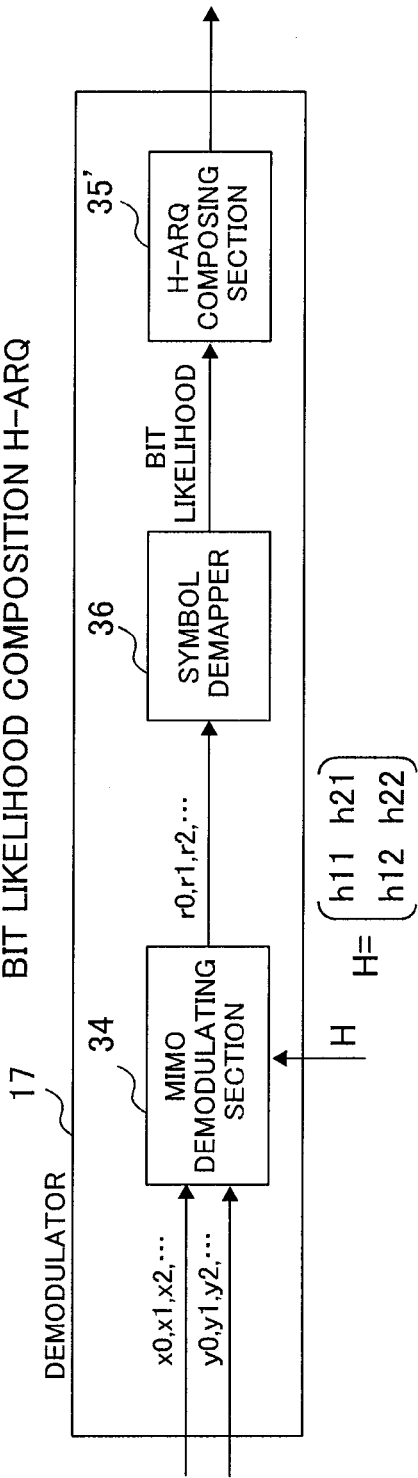

FIG.11A

STC MODE $r0 = x0 \cdot h11^* + x1^* \cdot h21 + y0 \cdot h12^* + y1^* \cdot h22$ $r1 = x0 \cdot h21^* - x1^* \cdot h11 + y0 \cdot h22^* - y1^* \cdot h12$ $r2 = x2 \cdot h11^* + x3^* \cdot h21 + y2 \cdot h12^* + y3^* \cdot h22$ $r3 = x2 \cdot h21^* - x3^* \cdot h11 + y2 \cdot h22^* - y3^* \cdot h12$ $r4 = \cdots$

FIG.11B

SM MODE (MMSE)

$$\begin{pmatrix} r(2n) \\ r(2n+1) \end{pmatrix} = (I + \alpha H^H H)^{-1} H^H \begin{pmatrix} x(n) \\ y(n) \end{pmatrix} \qquad H = \begin{pmatrix} h11 & h21 \\ h12 & h22 \end{pmatrix}$$

FIG.12
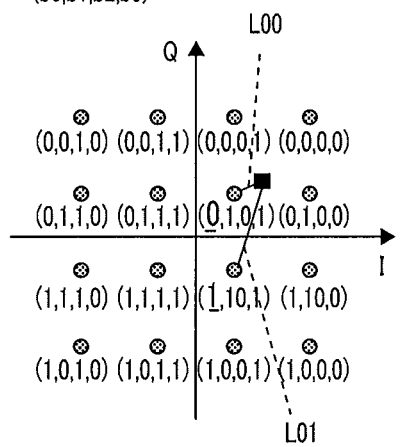
b0 LIKELIHOOD = $L00^2 - L01^2$
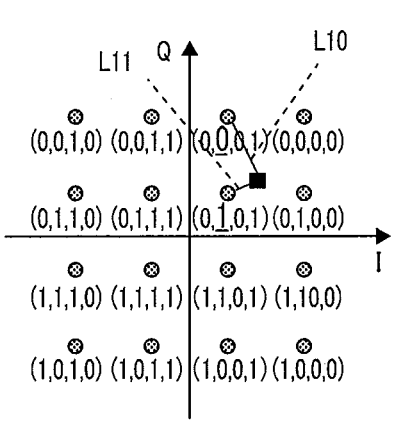
b1 LIKELIHOOD = $L10^2 - L11^2$
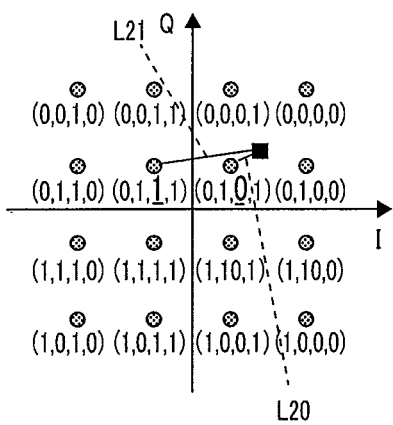
b2 LIKELIHOOD = $L20^2 - L21^2$
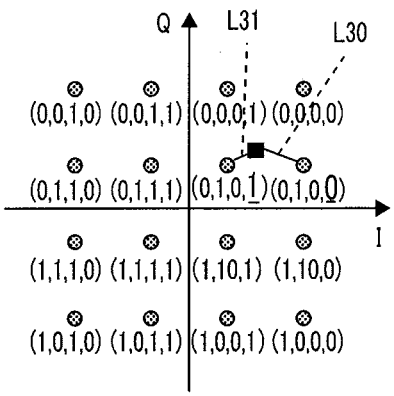
b3 LIKELIHOOD = $L30^2 - L31^2$

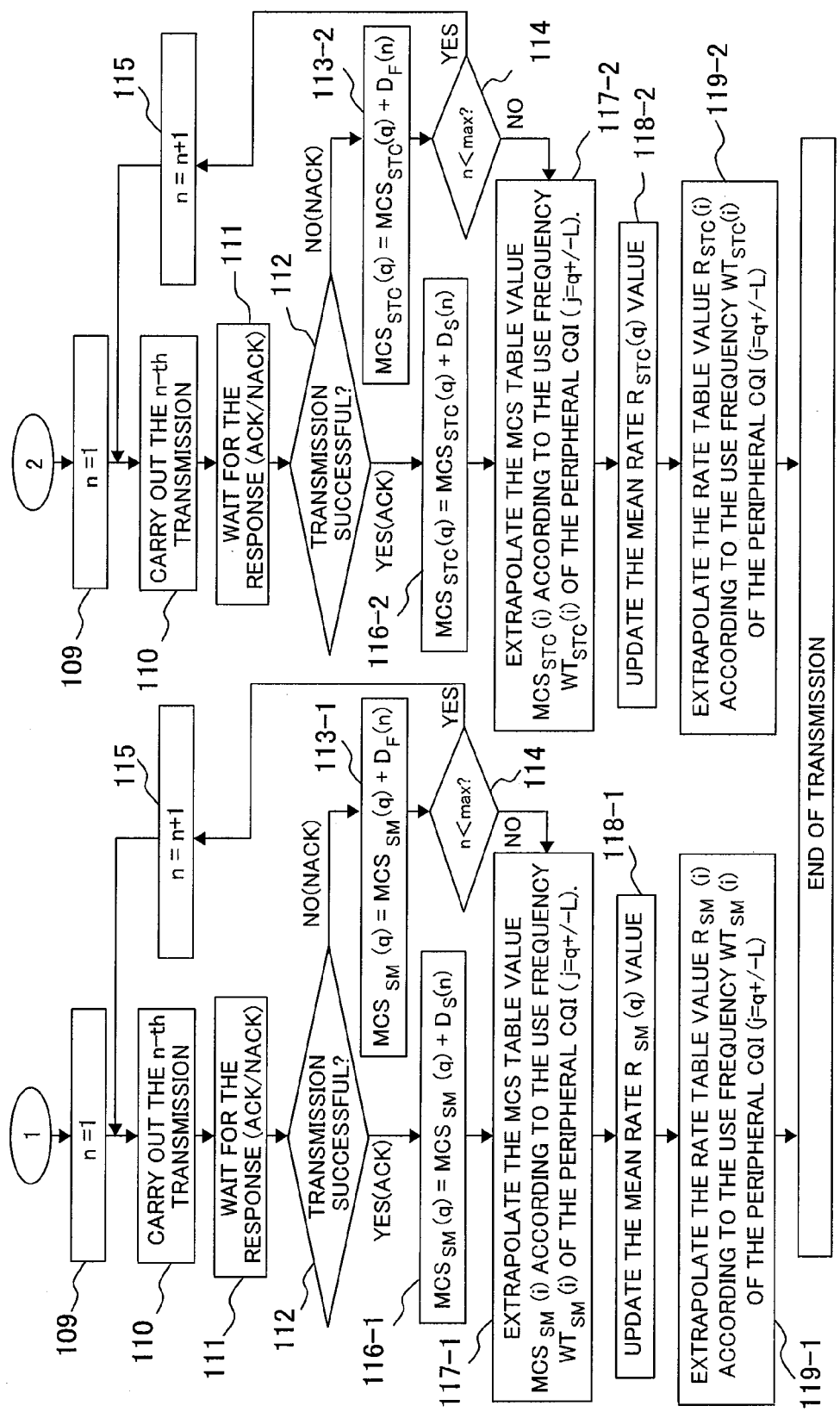

FIG. 18

| MCS | MODULATING SYSTEM | ENCODING SYSTEM |
|---|---|---|
| 0 | MOD(0) | CODE(0) |
| 1 | MOD(1) | CODE(1) |
| 2 | MOD(2) | CODE(2) |
| ⋮ | ⋮ | ⋮ |
| 7 | MOD(7) | CODE(7) |

FIG. 19

| TRANSMISSION COUNT | SUCCESSFUL TIME (ACK) | FAILURE TIME (NACK) |
|---|---|---|
| 1 | $D_S(1)$ | $D_F(1)$ |
| 2 | $D_S(2)$ | $D_F(2)$ |
| 3 | $D_S(3)$ | $D_F(3)$ |
| 4 | $D_S(4)$ | $D_F(4)$ |

FIG.20A

| TRANSMISSION COUNT | SUCCESSFUL TIME (ACK) | FAILURE TIME (NACK) |
|---|---|---|
| 1 | + 0.00001 | + 0.001 |
| 2 | 0 | − 0.1 |
| 3 | 0 | 0 |
| 4 | 0 | 0 |

FIG.20B

| TRANSMISSION COUNT | SUCCESSFUL TIME (ACK) | FAILURE TIME (NACK) |
|---|---|---|
| 1 | + 0.00001 | 0 |
| 2 | + 0.001 | − 0.1 |
| 3 | 0 | 0 |
| 4 | 0 | 0 |

FIG.20C

| TRANSMISSION COUNT | SUCCESSFUL TIME (ACK) | FAILURE TIME (NACK) |
|---|---|---|
| 1 | + 0.00001 | 0 |
| 2 | + 0.001 | 0 |
| 3 | − 0.1 | 0 |
| 4 | 0 | − 0.1 |

FIG. 21

| CQI | USE FREQUENCY (STC) | USE FREQUENCY (SM) |
|---|---|---|
| 0 | $WT_{STC}(0)$ | $WT_{SM}(0)$ |
| 1 | $WT_{STC}(1)$ | $WT_{SM}(1)$ |
| 2 | $WT_{STC}(2)$ | $WT_{SM}(2)$ |
| ... | ... | ... |
| 31 | $WT_{STC}(31)$ | $WT_{SM}(31)$ |

AMC TABLE FOR STC

AMC TABLE FOR SM

WHEN STC MODE IS SELECTED

WHEN SM MODE IS SELECTED

CODING AND MODULATION SELECTING METHOD AND WIRELESS COMMUNICATION EQUIPMENT

CLAIM OF PRIORITY

The present invention claims priority from Japanese patent application JP 2008-253074 filed on Sep. 30, 2008, the content of which is hereby incorporated by reference into this application.

BACKGROUND OF THE INVENTION

The present invention relates to a radio communication apparatus that selects and uses a proper one of plural transmission systems, as well as a technique for switching among those transmission systems.

There is a well-known wireless, radio communication system usable for mobile communications, etc. in an environment in which the subject radio channel property is frequently changed. The radio communication system uses a technique for making communications by selecting a proper one of encoding systems, a proper one of modulating systems, etc. respectively. There is also a technique that changes references for selecting those encoding and modulating systems in accordance with the actual communication circumstances. The technique is disclosed in, for example, Japanese Patent Application Laid-Open Publication No. 2003-143654. In this Japanese Patent Application Laid-Open Publication No. 2003-143654, the SIR (Signal to Interference power Ratio) is used to change the MCS (Modulation and Coding Scheme) level and control the received SIR reference value used to change the MCS level in accordance with the actual communication circumstances. The present inventors have disclosed an improved technique of the MIMO (Multiple Input Multiple Output) communication system as a related invention in this technical field of Japanese Patent Application Laid-Open Publication No. 2004-266586.

BRIEF SUMMARY OF THE INVENTION

In case of the technique disclosed in Japanese Patent Application Laid-Open Publication No. 2003-143654, upon changing the MCS level, the reference value is changed in accordance with the receiving performance of each subject mobile machine. However, the reference value should preferably be changed so as to keep a higher communication throughput. And a radio communication apparatus, when it is required to cope with plural MIMO communication systems, comes to be required to change all of the MIMO communication system, the encoding system, and the modulating system to another more proper one respectively.

Under such circumstances, it is an object of the present invention to provide an encoding/modulating system switching method to be used in a radio communication apparatus that uses plural communication systems such as MIMO communication systems so as to assure a high communication throughput. It is another object of the present invention to provide a radio communication apparatus capable of realizing the encoding/modulating system switching method.

In order to achieve the above object, the encoding/modulating system switching method of the present invention changes the MCS value to be used in accordance with the transmission count for the same data and the result (success/failure) of the communication step by step, thereby the MCS value can be controlled so as to assure a higher communication rate within a range in which chain retransmission occurrence is prevented. And the radio communication apparatus of the present invention is configured so as to realize the encoding/modulating system switching method.

In other words, the encoding/modulating system switching method of the present invention, which is employed for the above radio communication apparatus, can change references for selecting the encoding and modulating systems properly in accordance with the transmission count and the result (success/failure) of the communication respectively.

Furthermore, the radio communication apparatus of the present invention can use plural communication modes for radio communications. The apparatus includes a radio frequency circuit; a demodulating/decoding section that demodulates/decodes a signal received by the radio frequency circuit; an encoding/modulating section that encodes/modulates transmission data and outputs the result to the radio frequency circuit; and a processing section that selects encoding and modulating systems to be used in the encoding/modulating section according to a CQI (Channel Quality Information) value extracted from the signal received by the demodulating/decoding section. This processing section also controls so that the encoding/modulating section encodes and modulates transmission data according to the selected encoding and modulating systems and transmits the results to the destination. Furthermore, the processing section changes the references for selecting the encoding and modulating systems according to the transmission count and the result (success/failure) of the communication.

This is why the encoding/modulating system switching method of the present invention can assure a high throughput (mean rate) even in an environment in which the statistical characteristics of the subject communication channel are often changed.

Furthermore, the radio communication apparatus of the present invention can select a proper one of the plural communication systems, as well as a proper one of the plural encoding systems and a proper one of the plural modulating systems respectively so as to assure such a high communication throughput (mean rate).

BRIEF DESCRIPTION OF THE DRAWINGS

FIG. 5 is an AMC table used in the first embodiment;

FIGS. 7A and 7B are diagrams for describing a configuration and operations of a modulator used in the first embodiment;

FIGS. 10A and 10B are diagrams for describing a configuration and operations of a demodulator used in the first embodiment;

FIGS. 11A and 11B are diagrams for describing processings of a MIMO demodulating section used in the first embodiment;

FIG. 12 shows diagrams for describing operations of a symbol demapper used in the first embodiment;

FIG. 16B is a flowchart of the processings of the transmitter unit in the first embodiment;

FIG. 18 is an MCS value table used in the first embodiment;

FIG. 19 is an MCS value updating amount table in a configuration employed in the first embodiment;

FIGS. 20A-20C are MCS value updating amount tables in a preferable setting example in the first embodiment;

FIG. 21 is a CQI reference frequency information table in a configuration employed in the first embodiment;

DETAILED DESCRIPTION OF THE INVENTION

Figure 1:
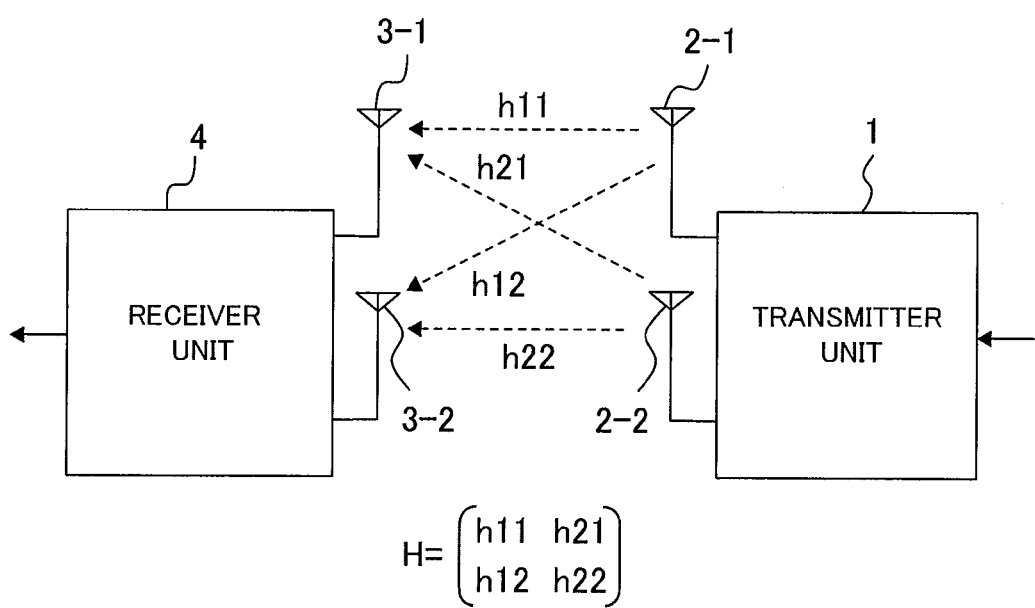
FIG. 1 is a block diagram of a radio communication apparatus for describing a relationship among a transmitter unit, a receiver unit, antennas, and radio channels.

Hereunder, there will be described first the radio communication apparatus of the present invention. As shown in FIG. 1, the radio communication apparatus is configured so that a transmitter unit 1 sends signals through plural antennas 2-1 and 2-2 and a receiver unit 4 receives those signals through a radio channel and through plural antennas 3-1 and 3-2.

In FIG. 1, only two antennas are used for transmitting and receiving signals. The number of those antennas may be more and may be different between transmitting and receiving. In the channel shown in FIG. 1, it is premised that signals sent out through the antenna 2-1 reach the receiving antennas 3-1 and 3-2 at complex gains h11 and h12 respectively while signals sent out through the antenna 2-2 reach the antennas 3-1 and 3-2 at complex gains h21 and h22, respectively. The communication channel is realized with use of a complex gain matrix H that uses elements h11 to h22.

Although descriptions are to be made only for the MIMO communication system picked as an example of the typical communication system in this specification, the present invention is not limited only to the system, of course. And note that the effective rate (throughput) of the communication channel may be referred to as a "measured rate" and a "mean rate."

First Embodiment

In this first embodiment, the radio communication apparatus selects a proper one of encoding systems and a proper one of modulating systems respectively, so that the apparatus is configured so as to enable the references for selecting those encoding and modulating systems to be changed in accordance with the transmission count and the result (success/failure) of the communication.

Figure 2:
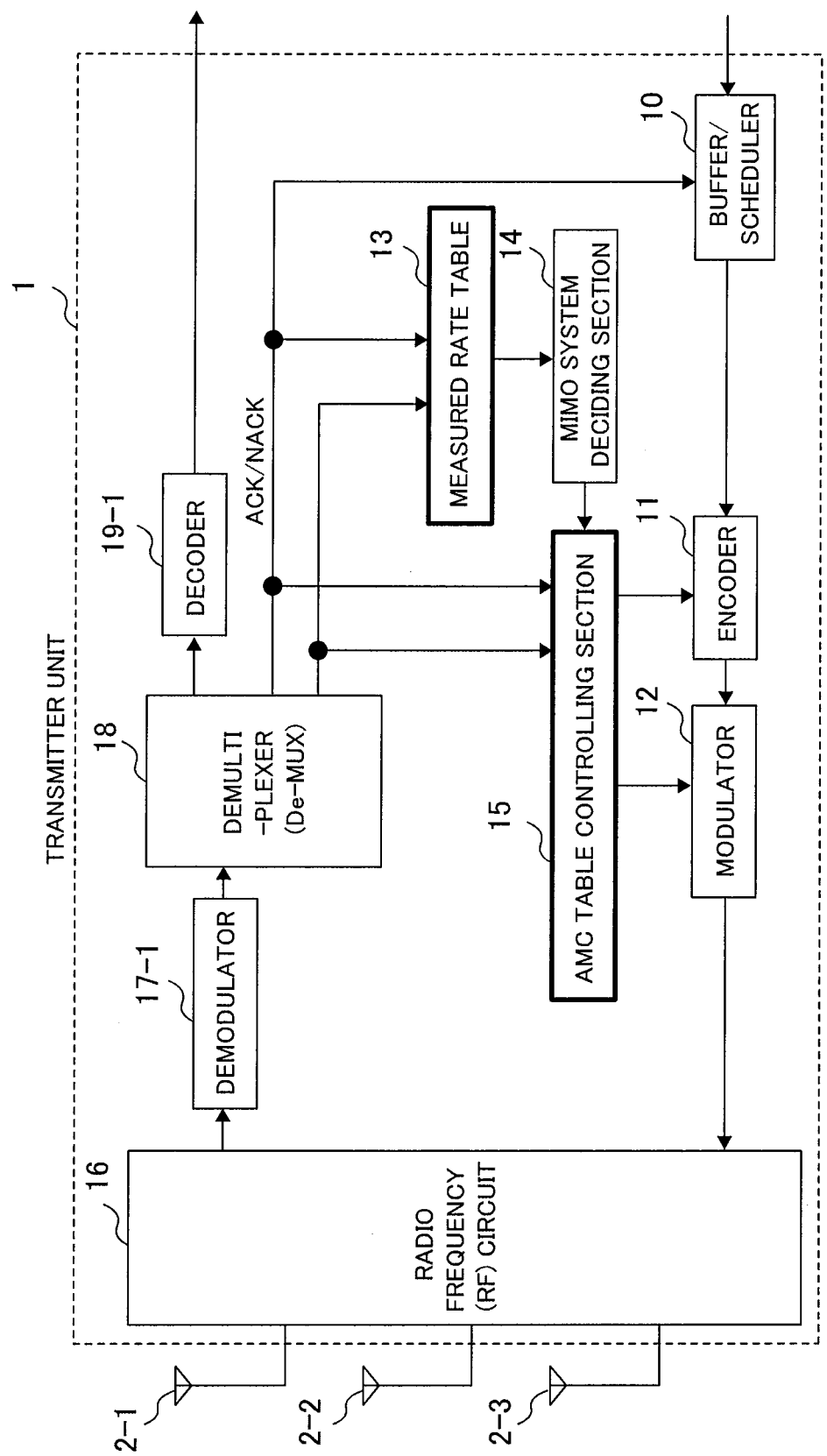
FIG. 2 is a block diagram of the transmitter unit in a configuration employed in a first embodiment.

FIG. 2 is a block diagram of the transmitter unit 1 of the radio communication apparatus in a functional configuration employed in this first embodiment. As described above, the transmitter unit 1 sends signals through the antennas 2-1 to 2-3. In this first embodiment, the unit 1 can select any of plural communication modes (MIMO modes) to send out signals. For example, the MIMO communication system includes an SM (Spatial Multiplexing) mode that enables high speed communications through parallel transmission and an STC (Space-Time Coding) mode that enables stable communications. Hereunder, it is premised that the unit 1 selects one of those SM and STC modes to send out signals. Of course, it is also possible to employ other MIMO modes such as a specific mode transmission mode that maps signals according to a unique vector of the subject channel matrix H, an STBC (Space-Time Block Code) mode that realizes stable communications with use of four or more antennas, etc.

Upon transmitting data to the receiver unit 4, the transmitter unit 1 refers to the CQI (Channel Quality Information) notified beforehand from the receiver unit 4. The CQI is included in each signal received through any of the antennas 2-1, 2-2, 2-3, etc. And to obtain the CQI, the subject signal is supplied to a demultiplexer (De-MUX) 18 through a radio frequency circuit 16 and a demodulator 17-1, then the signal is demultiplexed therein. The transmitter unit 1 uses the CQI to make high speed communications when the CQI denotes satisfactory communication channel quality and low speed communications when the CQI denotes unsatisfactory communication channel quality. Then, a MIMO system deciding section 14 decides and selects the MIMO mode (SM or STC) that can assure the highest rate communications with reference to a measured rate table 13 according to the currently notified CQI.

After this, according to the decision result of the MIMO system deciding section 14, an AMC (Adaptive Modulation and Coding) table controlling section 15 selects an encoding system and a modulating system appropriately to the current CQI with respect to the selected MIMO mode respectively.

The transmission data is held once in a buffer/scheduler 10 and supplied to the encoder 11 at a proper timing. The encoder 11 encodes signals according to the encoding system decided by the AMC (Adaptive Modulation and Coding) table controlling section 15 and supplies the result to the modulator 12. The modulator 12 then modulates the signals according to the modulating system and the MIMO mode decided above and sends the signals through the antennas 2-1, 2-2, 2-3 and through the radio frequency circuit 16.

Figure 4:
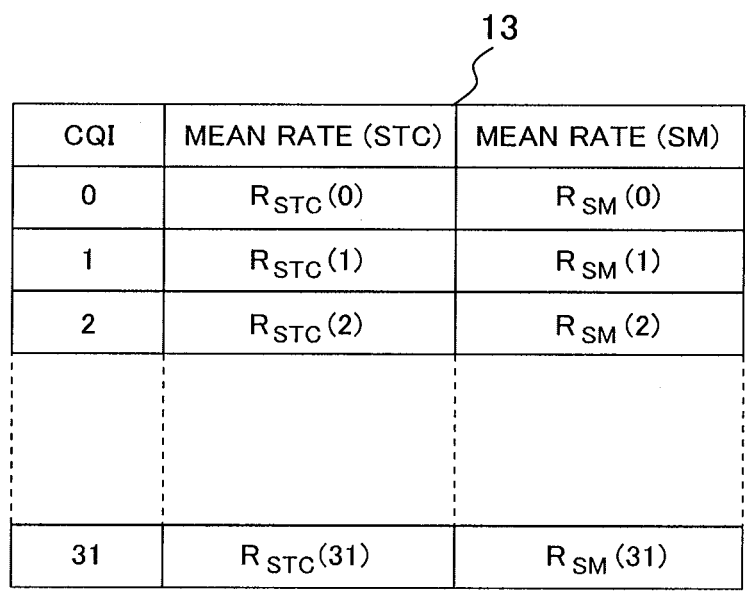
FIG. 4 is a measured rate table used in the first embodiment.

The measured rate table 13 holds CQI values, for example, as shown in FIG. 4. In the example shown in FIG. 4, the CQI has 32 values (0 to 31) and the table 13 stores a mean (communication) rate $R_{STC}(n)$ to be expected in the transmission in the STC mode and a mean (communication) rate $R_{SM}(n)$ to be expected in the transmission in the SM mode with respect to each of those CQI values. Those expected values are represented as follows in the equation 1.

$$R_{STC}(i) = \text{(Total bits transmitted successfully in the STC mode at CQI}=i\text{)/(Total time required in the STC mode transmission at CQI}=i\text{)}$$

$$R_{SM}(i) = \text{(Total bits transmitted successfully in the SM mode at CQI}=i\text{)/(Total time required in the SM mode transmission at CQI}=i\text{)} \quad \text{[Equation 1]}$$

Figure 6:
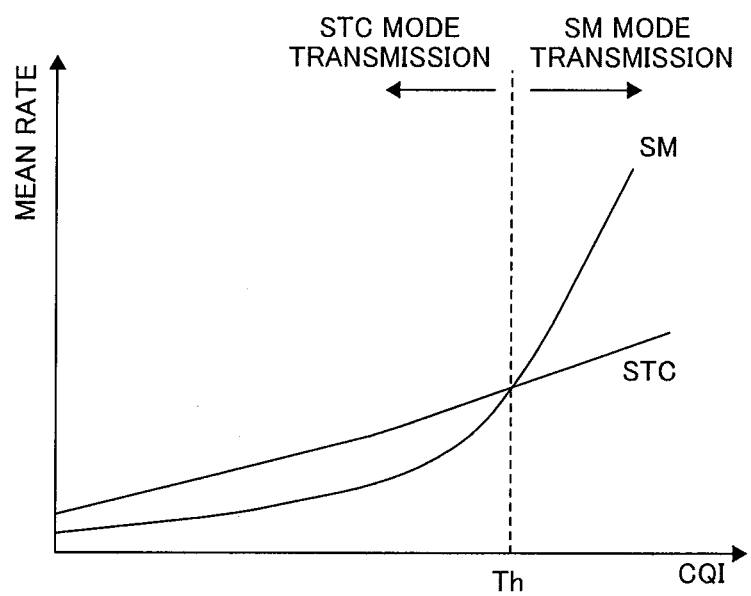
FIG. 6 is a graph denoting an example of the measured rate table used in the first embodiment.

This means that a given CQI makes it possible to judge which of the STC mode and the SM mode is more effective to obtain a higher communication rate. Consequently, if a mean rate held in the measured rate table 13 is as shown in FIG. 6, the MIMO system deciding section 14 comes to select the SM mode when the CQI value is higher than the threshold value Th on the horizontal axis and the STC mode when the CQI value is lower than the Th value.

Furthermore, the above-described AMC (Adaptive Modulation and Coding) table controlling section 15 holds an AMC table (STC/SM), for example, as shown in FIG. 5. In the example shown in FIG. 5, the AMC (Adaptive Modulation and Coding) table controlling section 15 holds an MCS (Modulation and Coding Scheme) value denoting proper encoding and modulating systems with respect to each of the 32 CQI values (0 to 31), thereby the section 15 comes to be able to select proper encoding and modulating systems in accordance with both a given CQI value and a given MIMO system, that are, the STC or SM mode can be selected in this first embodiment.

In the functional block diagram of the transmitter unit 1 shown in FIG. 2, each of the measured rate table 13, the MIMO system deciding section 14, and the AMC (Adaptive Modulation and Coding) table controlling section 15 consists of an ordinary CPU (Central Processing Unit) and an ordinary memory that are omitted in FIG. 2. Such tables as the AMC table (STC/SM) are stored in a memory. Of course, the judgments, decisions, and selections made according to the contents of those tables can be made with the use of programs loaded into the CPU, which is a processing section.

Figure 14:
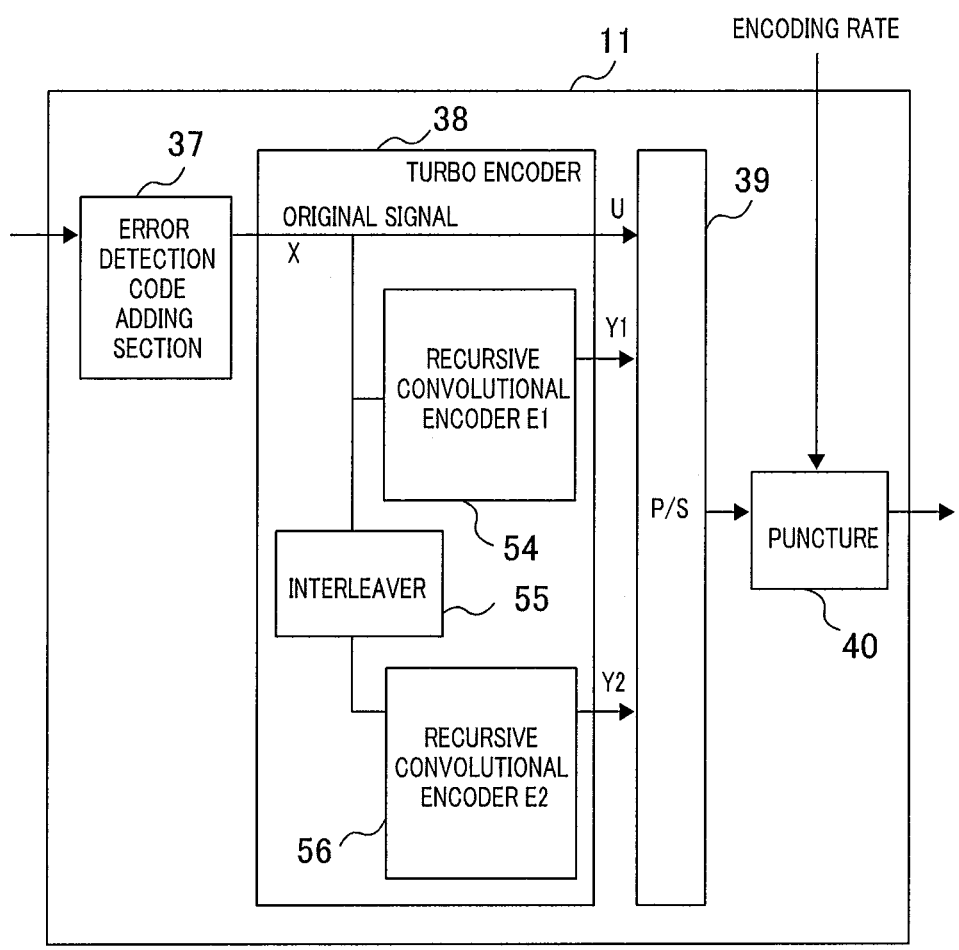
FIG. 14 is a block diagram of an encoder in a configuration employed in the first embodiment.

FIG. 14 shows a configuration of the encoder 11 shown in FIG. 2. The encoder shown in FIG. 14 uses turbo codes. At first, an error detection code is added to each transmission data in an error detection code adding section 37. Then, the data is encoded by two recursive convolutional encoders 54 and 56 and by an interleaver 55 provided in a turbo encoder 38, thereby code words U, Y1, and Y2 are output. Then, a parallel/serial (P/S) converter 39 converts the results to output a series of code words. After this, a puncture section 40 deletes some of the code words according to the encoding system decided by the AMC (Adaptive Modulation and Coding) table controlling section 15 with reference to an internal table, then outputs the encoded result. For example, if the convolutional encoders 54 and 56 are encoders having an encoding rate ½ respectively, each code word comes to consist of 2 redundant bits Y1 and two redundant bits Y2 with respect to a single information bit U. If the code word is not punctured at this time, the encoding rate becomes ⅕, and if a half of each of the Y1 and Y2 is deleted, the encoding rate becomes ⅓. And if Y1 and Y2 are deleted by ¾ respectively, the encoding rate becomes ½. If a code word of which the encoding rate is controlled in such a way is output as an encoding result, the interleaving processing should also be carried out at the same time to change the order of bits in the output bit stream.

Figure 8:
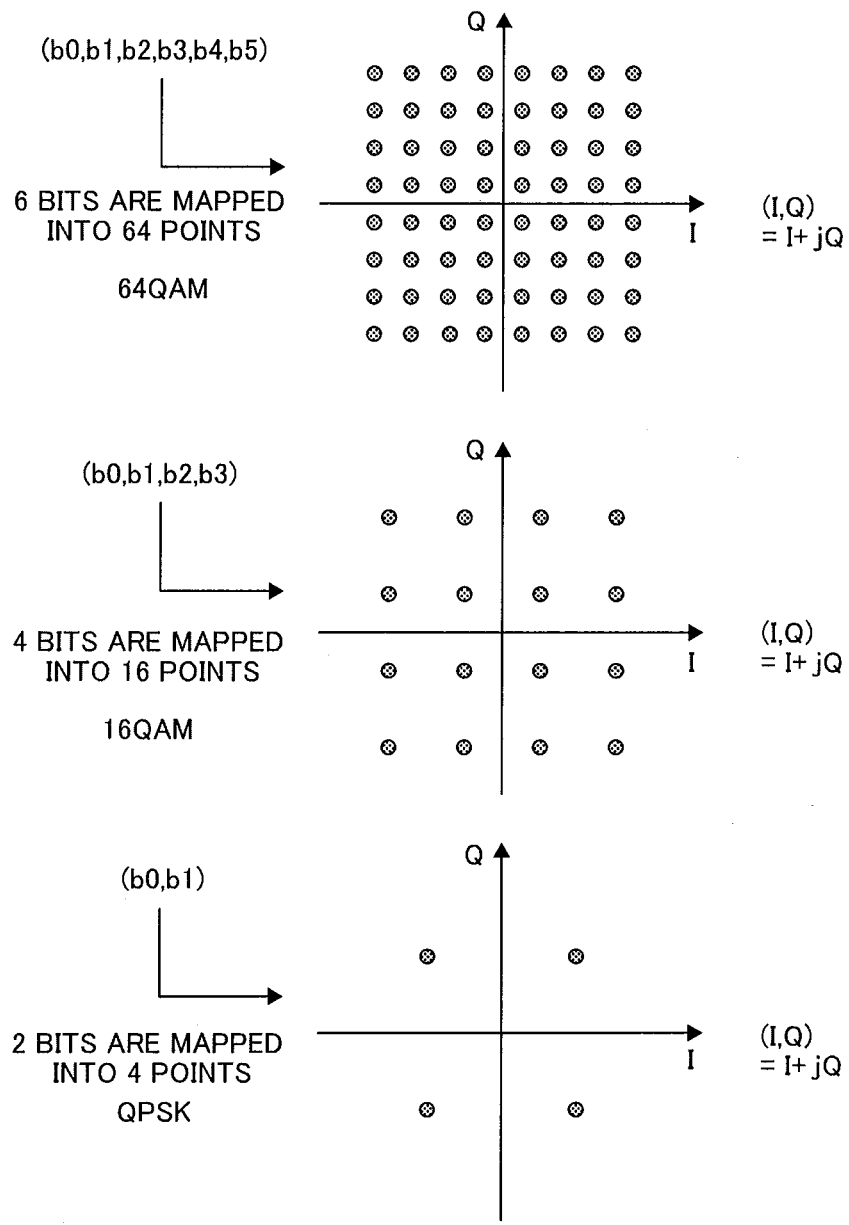
FIG. 8 shows diagrams for describing operations of a symbol mapper used in the first embodiment.

FIGS. 7A and 7B show configurations of the modulator 12 shown in FIG. 2. A bit stream (b0, b1, b2, . . . ) output from the encoder 11 is modulated according to a modulating system decided by a symbol mapper 31 and converted to a complex signal (s0, s1, s2, . . . ) consisting of an I (in-phase number) element and a Q (quadrature number) element. FIG. 8 shows diagrams for describing the operation of the symbol mapper 31. In FIG. 8 are shown three modulation types 64QAM, 16QAM, and QPSK (from up to down). In case of the 64QAM, bits (b0, b1, . . . , b5) are grouped in units of 6 bits and 64 bit combinations are mapped at 64 points on the I and Q complex plane to obtain an output signal I+jQ (modulation symbol). Similarly, in case of the 16QAM, bits (b0, b1, b2, and b3) are grouped in units of 4 bits and mapped at 16 points and in case of the QPSK, bits (b0 and b1) are grouped in units of 2 bits and mapped at four points. Respectively and successively supplied bit streams are also modulated repetitively in each modulation unit (6 bits, 4 bits, or 2 bits as described above).

In FIG. 7A, the modulation symbols output from the symbol mapper 31 are mapped to plural antennas by a MIMO mapper 32. The MIMO mapper 32 makes such signal mapping according to the decided MIMO mode. FIG. 7A shows an example of signal mapping with the use of two transmitting antennas in the SM mode. In the example shown in FIG. 7A, the output of modulation symbols is alternated between those two antennas so that each odd-numbered modulation symbol is output to the first antenna and each even-numbered modulation symbol is output to the second antenna. In such parallel outputs, the transmission rate can be doubled.

FIG. 7B shows an example of STC mode signal mapping (Alamouti method). In the STC mode, each modulation symbol is output to both of the two antennas and sent out in different modes. In other words, bits (s0, −s1*, s2, −s3*, . . . ) are output to the first antenna and bits (s1, s0*, s3, s2*, . . . ) are output to the second antenna. Here, the symbol * denotes a complex conjugate. In the STC mode, the same signal is sent out from both of the two antennas so as to assure highly stable communications.

Figure 9:
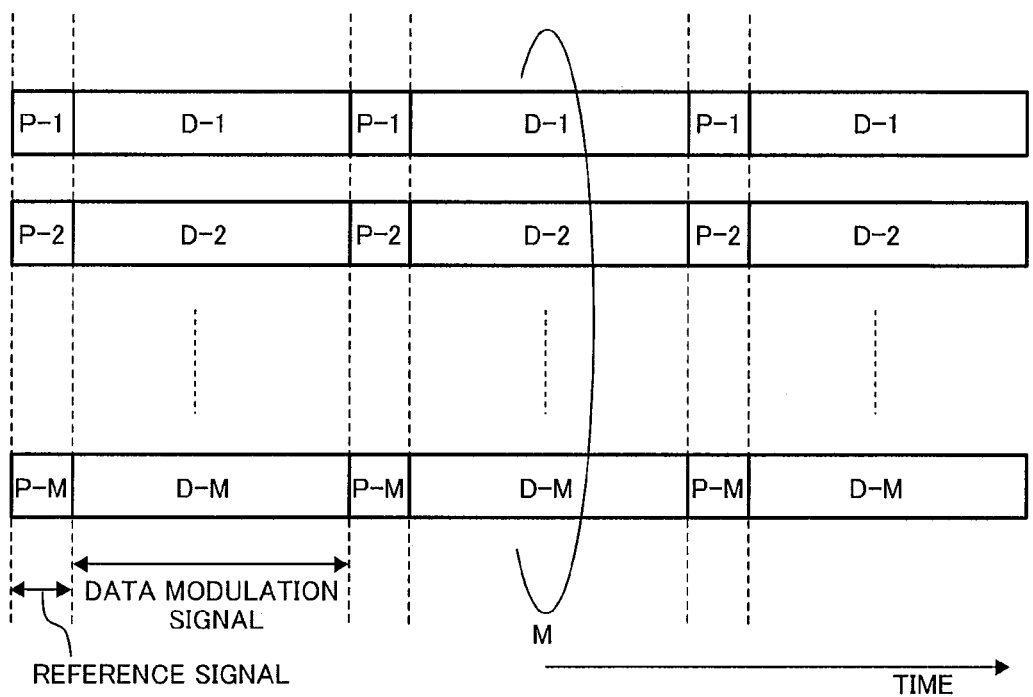
FIG. 9 is a diagram for describing operations of a reference signal inserting section used in the first embodiment.

A data modulation signal, which is a modulation symbol stream mapped at each antenna comes to include a reference signal inserted by a reference signal inserting section 33 and to be referred to by the receiver unit 4. FIG. 9 is a diagram for describing the operation of the reference signal inserting section 33 shown in FIGS. 7 (7A and 7B). Data modulation signals D-1 to D-M that are equal to the number of transmitting antennas (M antennas in FIG. 9) output from the MIMO mapper 32 come to have reference signals P-1 to P-M inserted periodically. The data modulation signals D-1 to D-M are generated from transmission data and varied among transmission data. Thus the signals D-1 to D-M are unknown at the receiver. The reference signals P-1 to P-M are decided by the subject communication system, so that they are already known at the receiver. Therefore, those signals P-1 to P-M are used as reference signals and the channel estimating section at the receiver to be described later uses those reference signals to estimate the subject channel.

Figure 3:
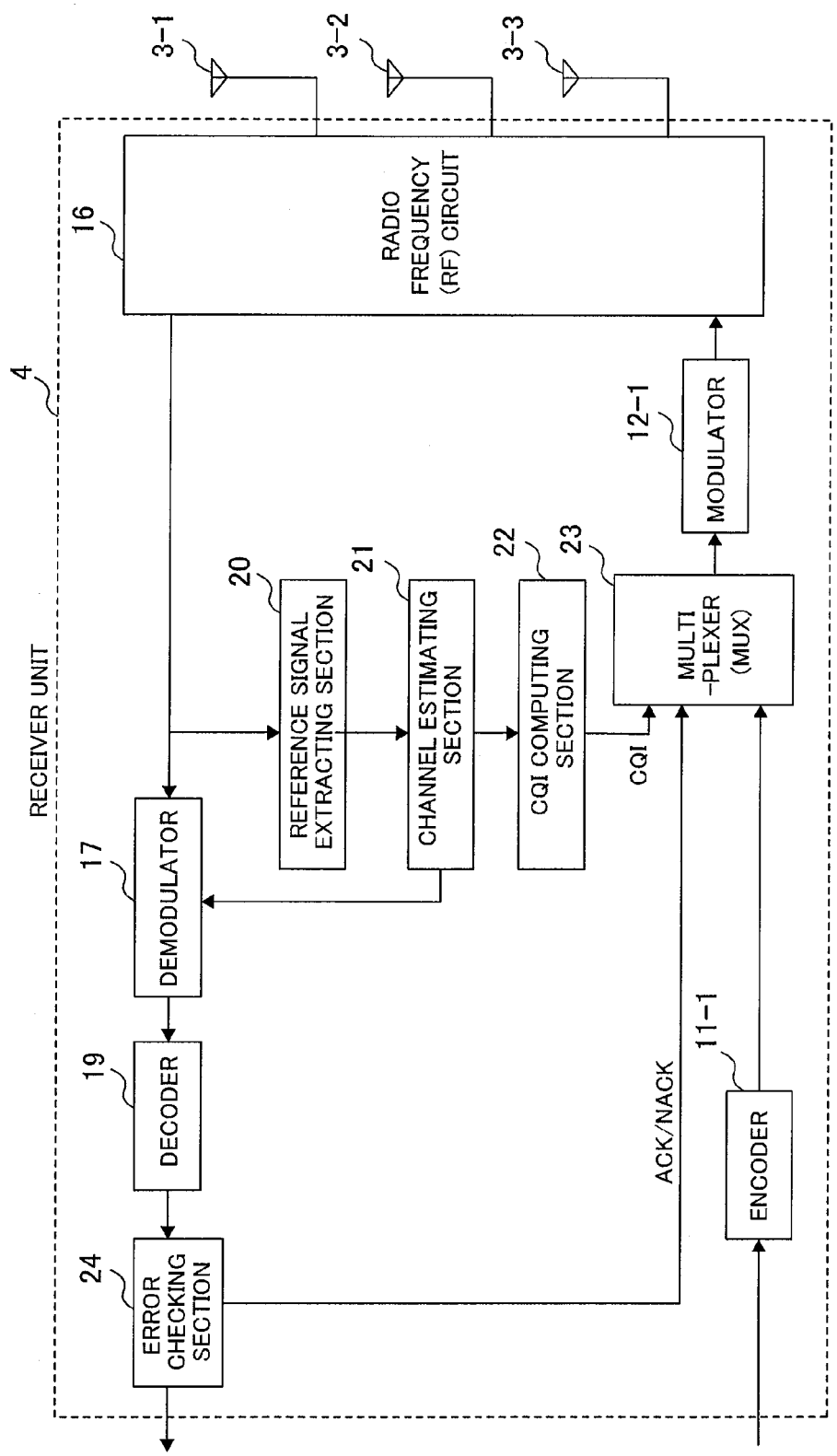
FIG. 3 is a block diagram of the receiver unit in a configuration employed in the first embodiment.

FIG. 3 shows a block diagram of the receiver unit 4 provided in the radio communication apparatus, in a configuration employed in this first embodiment. Signals received by plural antennas 3-1 to 3-3 are supplied to a reference signal extracting section 20 and to a demodulator 17 through a radio frequency circuit 16 respectively. The reference signal extracting section 20 separates and extracts the reference signals (P-1 to P-M) inserted by the transmitter unit 1 described above. The separated and extracted reference signals (P-1 to P-M) are then supplied to a channel estimating section 21 and the characteristics of the channel are checked therein. The characteristics of the channel to be checked here are the above-described complex gain matrix H, noise level, etc. required between the transmitter antennas 2-1 to 2-3 and the receiver antennas 3-1 to 3-3.

A CQI computing section 22 figures out a CQI (Channel Quality Information) by using the obtained channel characteristics. The CQI is a control signal for denoting the subject channel quality. The CQI may be simple control information based on a mean SNR (Signal to Noise Ratio) of the received reference signals (P-1 to P-M) or it may be control information based on an estimated value of the channel capacity denoting a degree of the possible communication rate.

Here, needless to say, each of the reference signal extracting section 20, the channel estimating section 21, and the CQI computing section 22 can be realized with a processing section (CPU) and a memory (for storing data and programs), which are omitted in FIG. 3 just like those in each of the receiver unit 4 and transmitter unit 1.

In this first embodiment, the obtained CQI is notified to the transmitter unit 1 through a multiplexer 23, a modulator 12-1, the radio frequency circuit 16, and each of the antennas 3-1 to 3-3 prior to the communication or periodically. As described above, in the transmitter unit 1, the MIMO mode, the encoding system, and the modulating system decided according to this CQI are used to send signals to the receiver unit 4.

Signals output to the receiver unit 4 from the transmitter unit 1 are supplied to the reference signal extracting section 20 and the demodulator 17 respectively through the antennas 3-1 to 3-3 and through the radio frequency circuit 16. The channel estimating section 21 checks the latest channel characteristics again with use of the reference signals (P-1 to P-M) extracted by the reference signal extracting section 20 and supplies the characteristics to the demodulator 17. The demodulator 17 then demodulates the received signals according to the obtained latest channel characteristics and supplies the demodulated signals to a decoder 19. The decoder 19 then makes error correction and decoding for the received signals so as to correct an error if it is detected in each demodulated signal. The received signals decoded by the decoder 19 are then supplied to a error checking section 24 so as to be checked for error existence. After this, each of those received signals is sent back to the transmitter unit 1 as a control signal, which is an ACK denoting receiving success or a NACK denoting receiving failure through the multiplexer 23, the modulator 12-1, the radio frequency circuit 16, and each of the antennas 3-1 to 3-3.

As described above, upon receiving an ACK (success) as a result of the sent-back control signal, the transmitter unit 1 completes the current data transmission and begins the next data transmission. Upon receiving a NACK (failure) as a result of the sent-back control signal, the transmitter unit 1 retransmits the current data. In case of this retransmission, the same data may be retransmitted or the redundant bits may be sent additionally. The redundant bits are those deleted by the puncture section 40 of the encoder 11 shown in FIG. 14 in the transmitter unit 1.

FIGS. 10A and 10B show configurations of the demodulator 17 of the receiver unit 4 in this first embodiment. In FIGS. 10A and 10B, two antennas are used. The signals (x0, x1, x2, ... ) and (y0, y1, y2, ... ) received through those two antennas are supplied to a MIMO demodulating section 34. The MIMO demodulating section 34 then carries out MIMO demodulation as shown FIGS. 11 (11A and 11B) for those received signals with use of the complex gain matrix H obtained by the channel estimating section 21.

For example, if the STC mode is set as the MIMO mode, the demodulation can be made according to the result of the computing as shown in FIG. 11A. If the SM mode is set as the MIMO mode, the demodulation can be made according to the result of computing as shown in FIG. 11B. In FIG. 11B, the "α" represents an integer decided by the SNR (Signal to Noise Ratio) of the subject received signal. Although FIG. 11B shows MIMO demodulation based on the MMSE (Minimum Mean Square Error) rule, the subject modulating system may be another corresponding to the SM mode, for example, Zero Forcing modulation or the like. The modulating system may also be MLD (Maximum Likelihood Detection) that requires batch processings to be carried out in cooperation with a symbol demapper 36 to be described later.

FIG. 10A shows demodulating processings for the same data that are retransmitted. In FIG. 10A, the MIMO demodulation results (r0, r1, r2, ... ) are supplied to an H-ARQ (Hybrid ARQ) combining section 35. The section 35 then combines the preceding MIMO demodulation results with the current demodulation result at each retransmission time and outputs the result of the combination (r0', r1', r2', ... ). In this case, because the same data are received in such a way, received signals are added up, thereby the quality of receiving is improved. The H-ARQ combination results (r0', r1', r2', ... ) are supplied to the symbol demapper 36, then demultiplexed into bit demodulation results according to the modulating system, thereby bit likelihood information is output.

FIG. 12 shows explanatory diagrams for describing the operation of the symbol demapper 36. In FIG. 12, a 16QAM case is shown. This also goes for any other modulating systems. Upon obtaining a 4-bit (b0, b1, b2, and b3) demodulation result, candidate points for b0=0 and b0=1 are selected from modulated signal points corresponding to b0=0 and b0=1 respectively, which are the closest to the received signal point (received symbol) denoted by the square in FIG. 12, then the distances between each selected candidate signal point and received signal point are measured and the results are assumed as L00 and L01. According to this result, $L00^2-L01^2$ is output as the b0 received signal likelihood. This processing is also carried out similarly to each of b1 to b3.

The demodulator 17 can also be configured as shown in FIG. 10B. The configuration shown in FIG. 10B that is applied to the case in which the completely same data is retransmitted can also be applied to the case in which redundant bits are additionally transmitted as described above. In the case of the configuration shown in FIG. 10B, the MIMO demodulation results (r0, r1, r2, ... ) are supplied to the symbol demapper 36 and converted to bit likelihood information. The bit likelihood information is then supplied to the H-ARQ combining section 35' so as to combine the retransmitted signals. If the same data is retransmitted, bit likelihood information is added to the likelihood of each bit at each retransmission time so as to combine the data just like in the case described in FIG. 10A. If redundant bits are added in such a way, the likelihood of the added redundant bits is combined with the bit likelihood, which is the previous demodulation result, thereby the reliability of the demodulation result is further improved.

Figure 13:
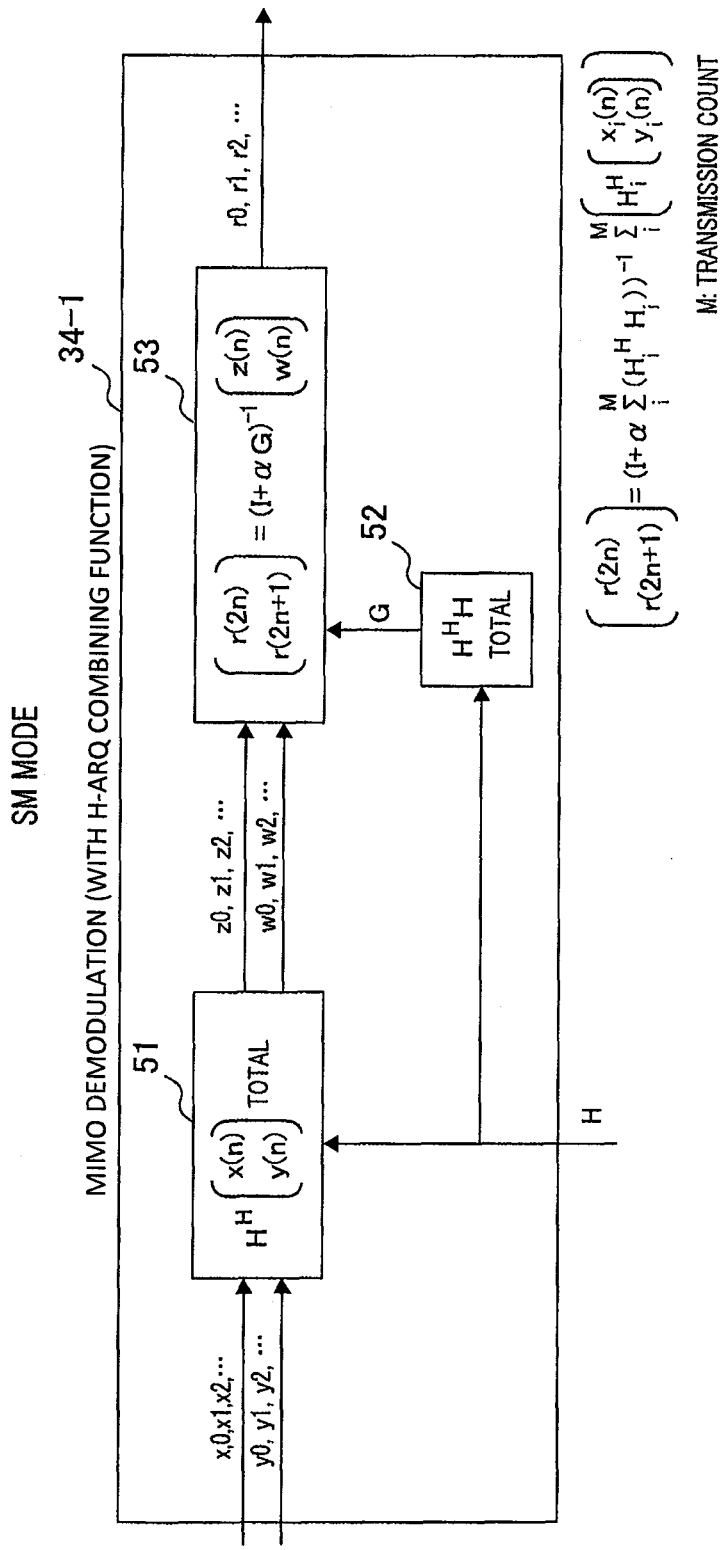
FIG. 13 is a diagram for describing another configuration and processings of the MIMO demodulating section used in the first embodiment.

If MMSE demodulation is to be carried out as the demodulation shown in FIG. 10A, the processings of the MIMO demodulator 34 and the H-ARQ combining section 35 should be carried out together, thereby the demodulation characteristics can be improved more than when the processings of the MIMO demodulator 34 and the H-ARQ combining section 35 are carried out separately. In the example shown in FIG. 13, the H-ARQ combination is carried out in the stage of the channel matrix H in prior to the MIMO demodulation. In other words, the received signal to be retransmitted is combined with the channel matrix H in each of accumulators 51 and 52 and an MMSE processing is carried out for the result in a processing section 53. This configuration is especially effective to improve the characteristics when the channel matrix H is changed at the retransmission time.

Figure 15:
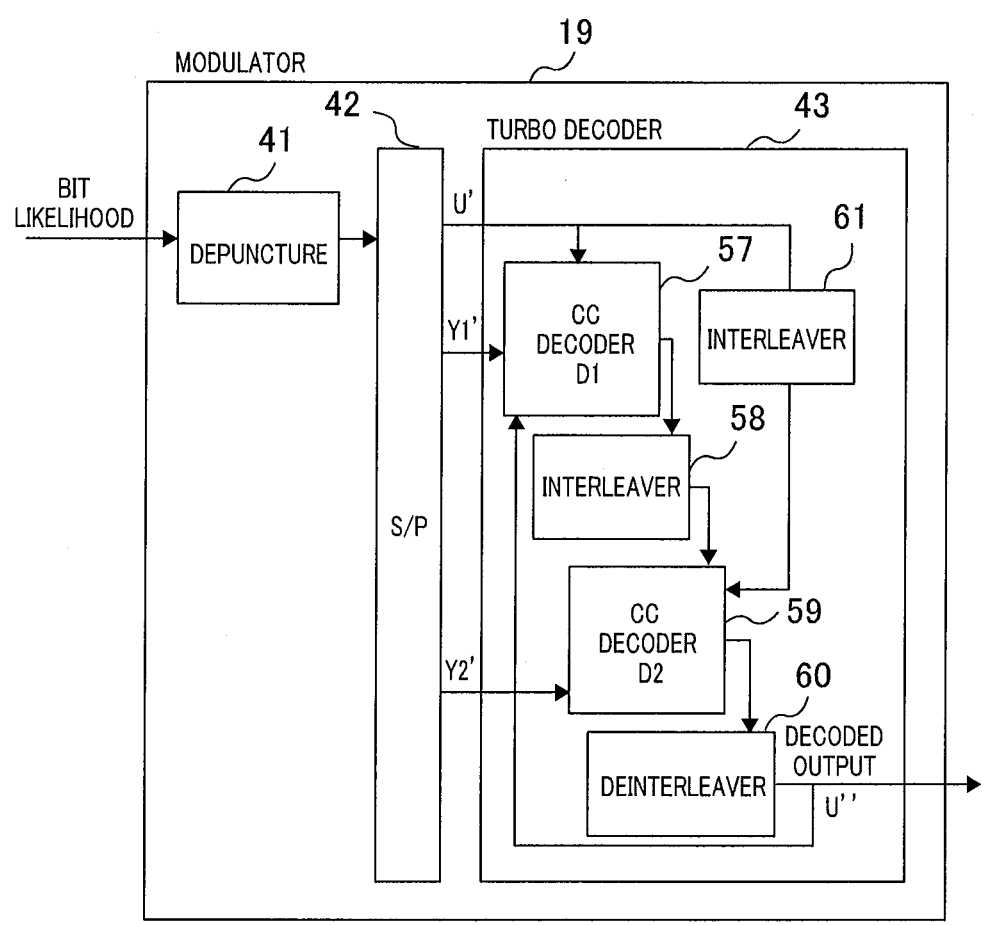
FIG. 15 is a block diagram of a decoder in a configuration employed in the first embodiment.

FIG. 15 shows a configuration of the decoder 19 used in the receiver unit 4 in this first embodiment. A series of signals received by the demodulator 17 is added to some of the code words deleted at the receiver in a depuncture section 41, then the result is output. At this time, these bits are not transmitted actually, so that the bit likelihood is assumed to be 0. After the depuncturing, the signals are separated into U', Y1', and Y2' in the serial/parallel (S/P) converter 42 and decoded by a turbo decoder 43, thereby the decoded signal U" is output. At this time, receiving errors are corrected repetitively in the decoding process with repetitive use of CC (Convolutional Code) decoders 57 and 59, interleavers 58 and 61, and a deinterleaver 60. If any interleaving is carried out here by the transmitter puncturing section 40, the puncturing section 40 described above is expected to carry out deinterleaving to restore the original order of the bits in the bit stream.

Next, using FIGS. 16A and 16B, there will be described in detail how to decide a proper communication system (MIMO, etc.), a proper encoding system, and a proper modulating system respectively, as well as how to update the measured rate table and the AMC table in the transmitter unit 1 in this first embodiment. These processings are carried out with use of the measured rate table 13, the MIMO system deciding section 14, and the AMC (Adaptive Modulation and Coding) table controlling section 15 included in the transmitter unit 1 shown in FIG. 2. Needless to say, the flowchart shown in FIG. 16A can also be executed with use of programs loaded into the CPU (not shown), which is equivalent to a processing section in the transmitter unit 1 described above.

Figure 16A:
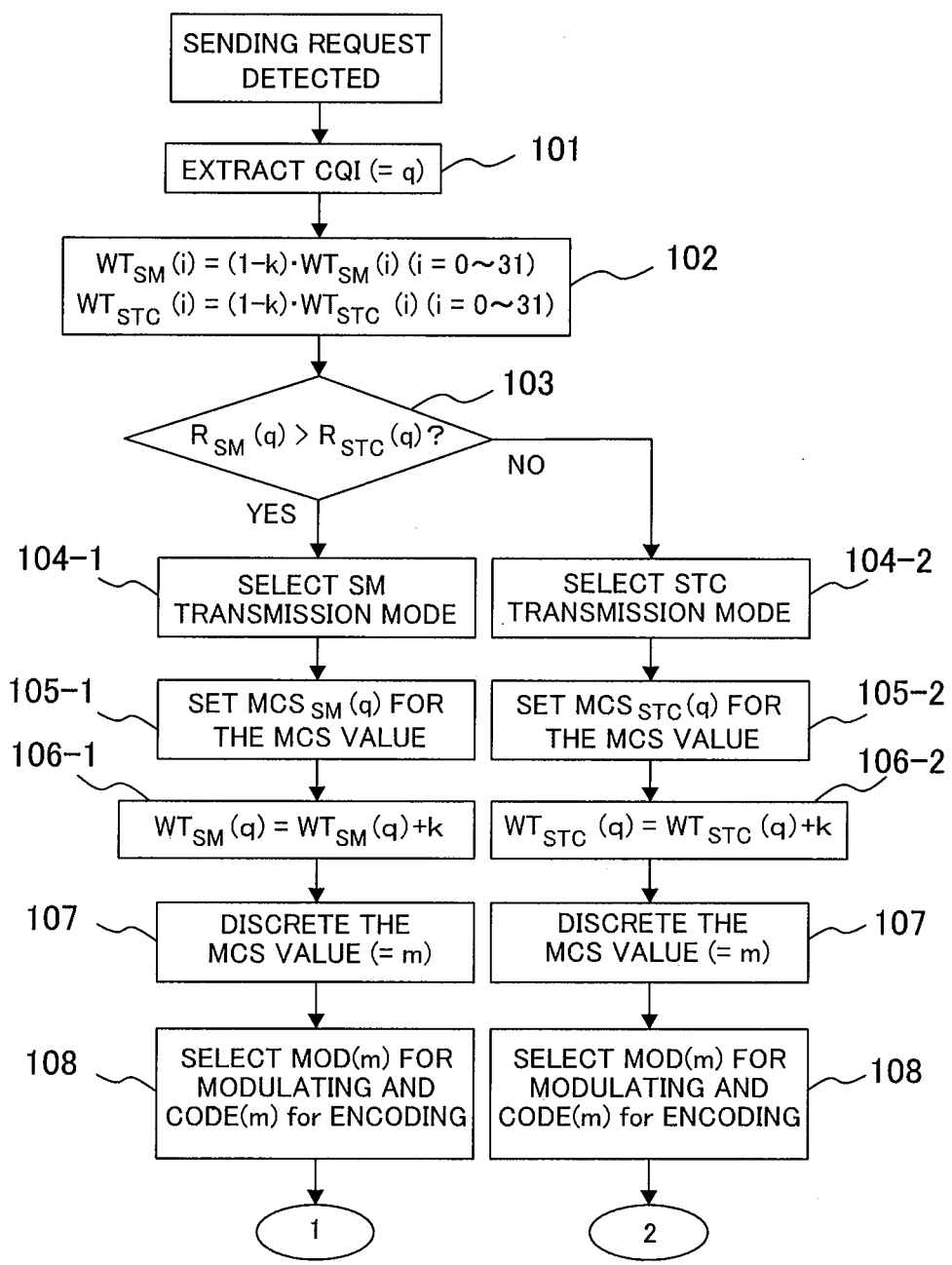
FIG. 16A is a flowchart of the discrete processings for the MCS value in the first embodiment.

In FIG. 16A, the processing section, upon detecting a transmission request, extracts the latest CQI in step 101. If the extracted CQI value is "q", the processing section refers to the mean rate held in the measured rate table 13 in step 103 to decide a MIMO mode that can assure a higher throughput (mean rate/effective rate). Then, according to the result of the decision, the MIMO system deciding section 14 decides a proper MIMO mode in steps 104-1 and 104-2. The AMC (Adaptive Modulation and Coding) table controlling section 15 then refers to the AMC table shown as an example in FIG. 5 in the decided MIMO mode to decide the MCS value in steps 105-1 and 105-2. In this embodiment, as described above, the STC mode and the SM mode can be selected as the MIMO mode at this time. The mode is not limited only to those, however; another communication mode can also be selected at this time, of course.

Figure 17:
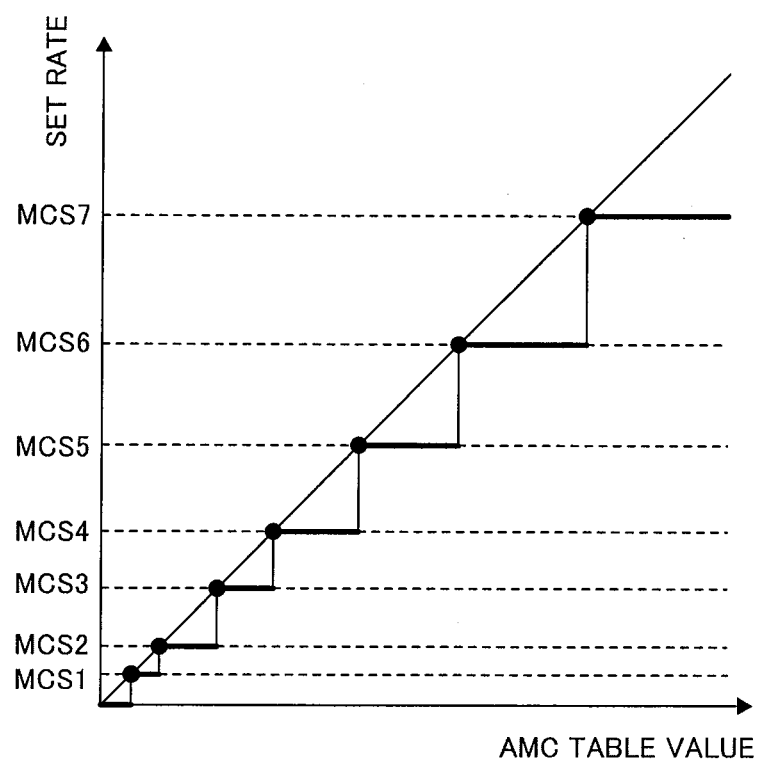
FIG. 17 is a graph for describing an example of the discrete processings for the MCS value in the first embodiment.

And because the AMC table shown in FIG. 5 holds consecutive values, the processing section (not shown) converts each subject value to a discrete MCS value in step 107 in FIG. 16A so as to be used actually by the transmitter unit 1 and by the receiver unit 4. In step 107, the processing section converts the subject value to the maximum discrete MCS value with use of a stepped function as shown in FIG. 17 within a range in which the discrete MCS value never exceeds any of the MCS values held in the AMC table. In FIG. 17, the horizontal axis denotes the AMC table value and the vertical axis denotes the MCS value (set rate).

If the discrete MCS value is "m" at this time, the processing section refers to a MCS table as shown in FIG. 18 in step 108 to select an encoding system (CODE(m)) and a modulating system (MOD(m)). The MCS table is stored in a memory (not shown) and the processing section that functions as an AMC table controlling section 15 reads the encoding and modulating systems corresponding to the subject MCS value from the memory and inputs them to the encoder 11 and the modulator 12 as control signals.

After the processing in step 108, the value of a counter n that counts the number of transmission (retransmission) times is initialized to 1 in step 109 in FIG. 16B. Then, in step 110, the radio frequency circuit 16 shown in FIG. 2 sends out signals in the MIMO mode and according to the encoding and modulating systems decided above. In step 111, the processing section waits for a control signal (ACK/NACK denoting the success/failure of the receiving) from the receiver unit 4.

The processing section, upon receiving a control signal (NACK (failure)) from the receiver unit 4, changes the MCS value having been used so far just by the receiving failure time updating (change) amount $D_F(n)$ in accordance with the current transmission count in steps 113-1 and 113-2. If the transmission count does not reach the preset maximum count (max) yet, 1 is added to the value of the counter n and control returns to step 110 to carry out the n-th retransmission. Upon receiving an ACK (success), the processing unit changes the MCS value having been used so far just by the receiving success time updating amount $D_S(n)$ in accordance with the transmission count n in steps 116-1 and 116-2.

A CPU makes this MCS value change with use of a program loaded into itself. The CPU is a processing unit that functions as the AMC (Adaptive Modulation and Coding) table controlling section 15. In this first embodiment, the value to be taken as each of the receiving failure time updating amount $D_F(n)$ and the receiving success time updating amount $D_S(n)$ is decided by the transmission count n as shown in FIG. 19. In FIG. 19, the updating amounts $D_F(n)$ and $D_S(n)$ are used within a range in which the maximum transmission count is four (max=4). Those updating amount tables are also stored in a memory (not shown). And the CPU that functions as the AMC (Adaptive Modulation and Coding) table controlling section 15 reads the updating amount corresponding to the result (success/failure) of the receiving and the transmission count.

In this first embodiment, the AMC (Adaptive Modulation and Coding) table controlling section 15 updates the MCS value held in the AMC table in steps 113-1, 113-2, 116-1, and 116-2. This is because the MCS differs even with respect to the same CQI if the statistical channel characteristics are different. For example, if the CQI is very accurate and the optimal communication rate, that is, the MCS value is decoded uniquely due to CQI notification, the receiving can be made almost successfully at the first transmission. If the channel quality variation is large and the CQI error is also large, however, the communication can be made only at a lower communication rate than that judged from the notified CQI value, although the communication can be made at a higher communication rate in some cases. In this case, if an MCS value enables the object data to be always received successfully at the first transmission, the communication comes to be made only at a lower communication rate than the mean communication rate.

If the subject CQI value includes an error or if the communication rate cannot be decided correctly only with the CQI value, it is recommended that at first the transmitting is made with the MCS that takes a slightly higher communication rate. If the transmission is made successfully at this time, the selected higher communication rate can be used as is. If the transmission fails, retransmission should be made just to complete the communication successfully. In other words, if it is judged that the CQI value is accurate and the communication can be made correctly only with the CQI value, the first transmission success probability should be set higher. If it is expected that the CQI value is not so accurate and the communication rate cannot be judged correctly only with the CQI, a higher communication rate should be selected within a range in which the receiving could be successful even when it is expected that the first transmission might result in failure at high possibility.

However, it should be avoided that an excessively high communication rate is set. Otherwise, chain retransmission often occurs and every the retransmission might come to fail. Upon selecting an MCS value, therefore, a higher communication rate that can prevent such chain retransmission occurrence should preferably be selected. In other words, upon changing the MCS value properly in the AMC table, consideration should be taken of how the transmission (retransmission) count will affect the change of the success/failure probability. In this first embodiment, in such a point of view, the MCS value updating amounts $D_F(n)$ and $D_S(n)$ are set differently according to the transmission count at both success and failure times.

The updating amount shown in FIG. 19 should preferably be set as any of those shown in FIGS. 20A, 20B, and 20C. In the updating amount table shown in FIG. 20A, each updating amount is set as a positive value so as to enable the MCS value to be set slightly higher at the first transmission time regardless of success and failure of the transmission. And a negative value is set for each updating value so as to lower the MCS value if the second transmission results in failure. In other cases, the updating amount is set at 0 so as to prevent MCS value changes. As a result, in FIG. 20A, if the ratio between the frequency of the first receiving failure and the frequency of the second receiving failure becomes about 100:1, the expected MCS value increment amount and the expected MCS decrement value become almost equal, thereby the MCS values are converged. This means in the case shown in FIG. 20A that the number of failures in retransmission is suppressed so as to prevent chain retransmission occurrence while the first transmission failure is overlooked.

Almost the same effects can also be expected in FIG. 20B. In other words, the MCS value just increases slightly at the first transmission. In this case, the MCS value is controlled so that the probability ratio between the second transmission success and the second transmission failure becomes about 100:1. In the example shown in FIG. 20C, the MCS value is also controlled so that the probability ratio between the success in the second transmission and the success in the third transmission becomes about 100:1. In FIG. 20C, if the receiving fails even at the maximum transmission count, the MCS value is lowered. Thus the MCS value updating amount table should preferably be set so that the MCS value can be set within a range in which chain retransmission occurrence is prevented by taking consideration of the valence between the success and failure frequencies while transmission and retransmission are repeated as described above.

In this first embodiment, if the receiving is successful or if the transmission count reaches the maximum count, the subject mean rate value $R_{SM}(q)$ or $R_{STC}(q)$ in the measured rate table shown in FIG. 4 is updated in steps 118-1 and 118-2 in FIG. 16B. As described above, the measured rate table holds the mean rate (throughput) of the actual communications finished successfully so far.

Furthermore, in the processings described above, the frequency information to be referred to at the time of table updating to be described later, that is, the use frequency information WT about the combination of a CQI and a MIMO mode as shown in FIG. 21 is updated in steps 102, 106-1, and 106-2 in FIG. 16A. The processings in steps 102, 106-1, and 106-2 are executed to measure the use frequency with the use of an oblivion coefficient (1−k) and computed so as to set a large value for the use frequency information WT when the use frequency was high in the near past.

After this, the transmitter unit 1 also updates the AMC table and the mean rate in the measured rate table in steps 117-1, 117-2, 119-1, and 119-2 in FIG. 16B in this first embodiment. To make those updating processings, the transmitter unit 1 refers to the use frequency information WT described above. Why those tables are updated in steps 117-1, 117-2, 119-1, and 119-2 is to be ready for the use that might be required in the future due to a change of the statistical channel characteristics while those table values are not used currently. The MCS value in the currently set MIMO mode is updated in steps 113-1, 113-2, 116-1, and 116-2 as described above and the mean rate is updated in steps 118-1 and 118-2, thereby the tables come to hold proper values respectively.

However, according to the result of the comparison in step 103 in FIG. 16A, it was decided that the MCS value and the mean rate value were not used in the subject MIMO mode. Thus those values were not updated at that time. And if those values are not to be used in the future, as well, they are not required to be correct values. Nevertheless, there is still expected a case, in which the optimal value and the mean rate in the AMC table are to be changed due to a change of the statistical channel characteristics. This is why both the MCS value and the mean rate value are required to be updated here even with respect to the MIMO mode that has not been used. In this embodiment, therefore, if there is a low use frequency CQI value in the neighborhood (q±L) of the currently used CQI value, the MCS value and the mean rate value corresponding to the CQI are updated with use of an estimated value respectively in steps 117-1, 117-2, 119-1, and 119-2. This estimation can be made by a known method, such as extrapolation by linear approximation, extrapolation by higher order approximation, etc.

Figure 22:
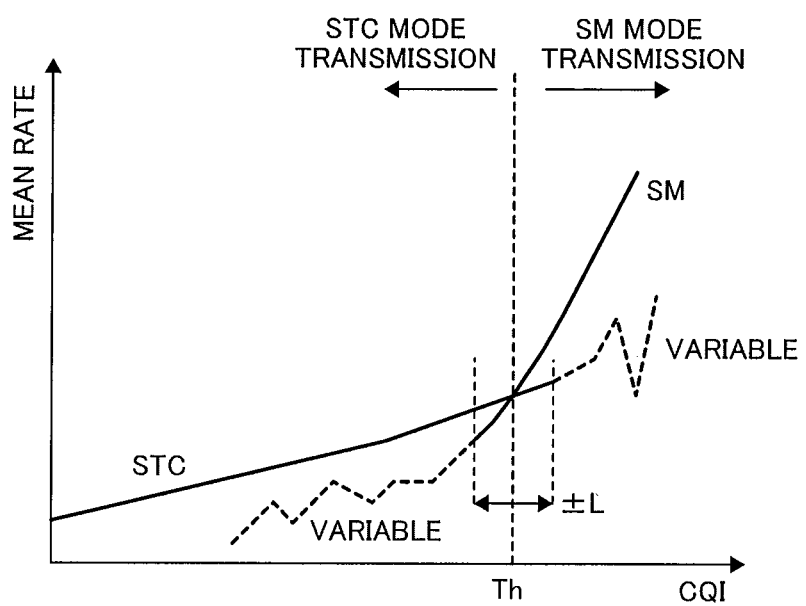
FIG. 22 is a graph for describing the result of updating processings for a mean rate table with use of estimated values in the first embodiment.
Figure 23A:
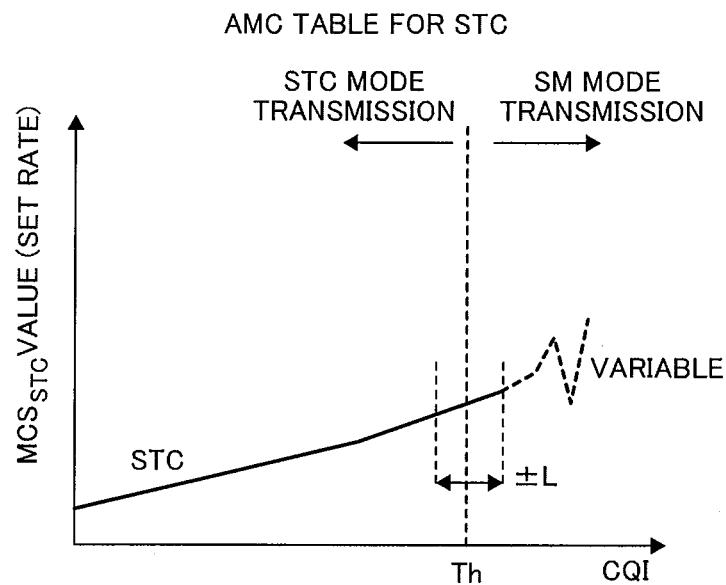
FIGS. 23A and 23B are graphs for describing the result of updating processings for an AMC table with use of estimated values in the first embodiment.
Figure 23B:
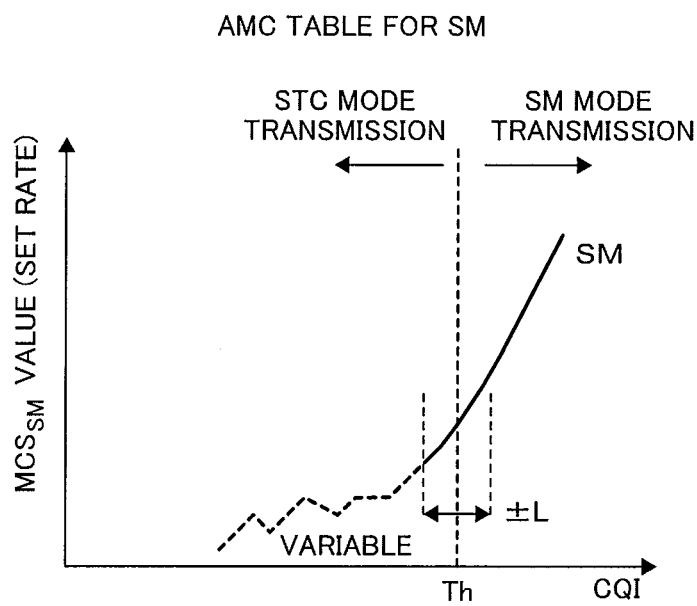

As a result, a value obtained by an estimated value comes to be held in the neighborhood (±L) of the MIMO mode switchover point Th with respect to the mean rate in the measured rate table as shown in FIG. 22 and with respect to the AMC table as shown in FIGS. 23A and 23B. The CQI value, when it is separated more than ±L from the switchover point Th, is not updated by an estimated value. And the value becomes variable. Even in such a case, it is expected that the statistical channel characteristics are varied step by step, so that the CQI value in the neighborhood of the switchover point Th comes to be used first. Consequently, the value comes to be updated correctly, thereby the switchover point Th moves and its neighborhood is estimated. Updating by such an estimated value could thus be required only around the switchover point Th.

Figure 24B:
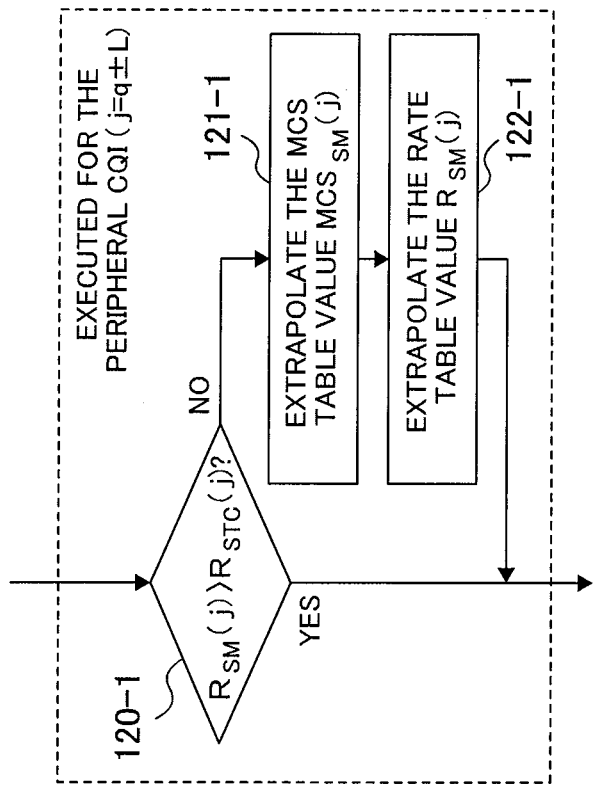
FIGS. 24A and 24B are flowcharts of the processings for updating the mean rate table and the MCS table of a peripheral CQI in the first embodiment.
Figure 24A:
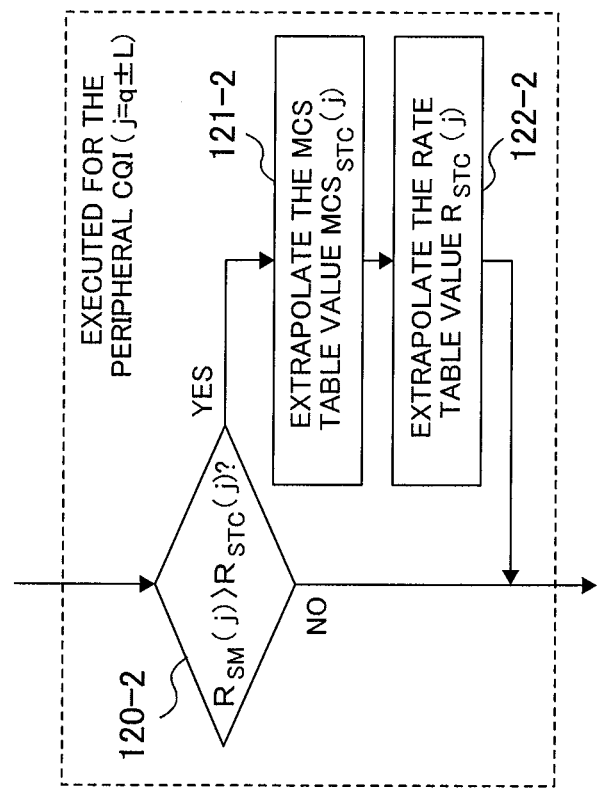

In steps 117-1, 117-2, 119-1, and 119-2, it is decided whether to make the above updatings with the use of estimated values according to the use frequency information WT respectively. As shown in the examples in FIGS. 24A and 24B, it is also possible to decide whether or not each object neighborhood CQI value (q±L) is that of an unused table with reference to the measured rate table 13, which is used to select the current MIMO mode (steps 120-1 and 120-2), then to update the MCS value, the mean rate value, etc. in the AMC table and in the mean rate table with use of estimated values obtained by extrapolation respectively (steps 121-1, 121-2, 122-1, and 122-2). In this case, no updating step is required for the use frequency table shown in FIG. 21 and for the use frequency table updated in steps 101, 106-1, and 106-2.

Figure 25:
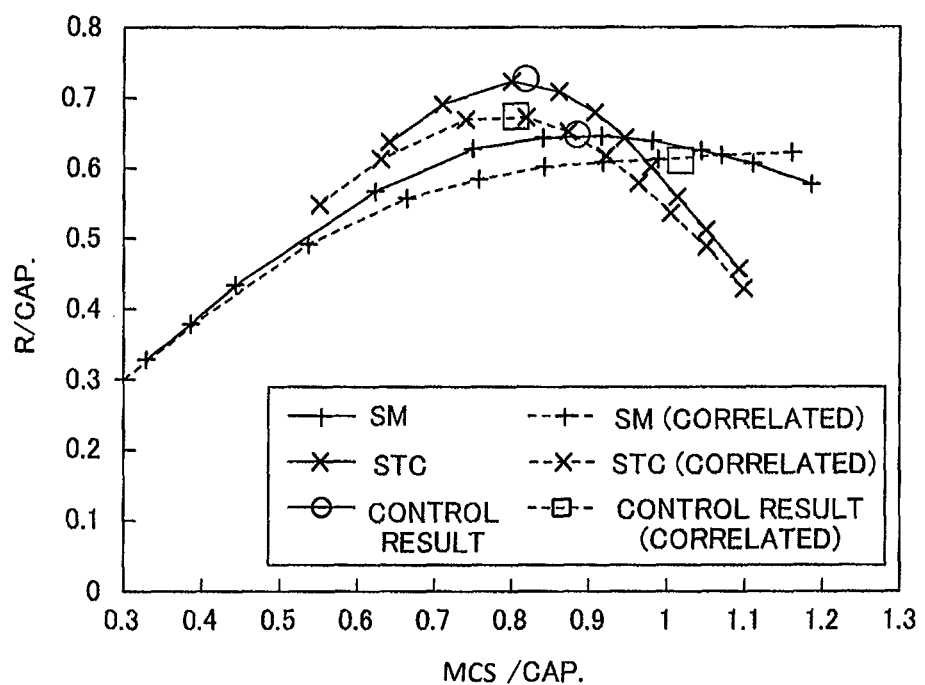
FIG. 25 is a graph for describing the effects of the AMC table updating processing according to the present invention.

FIG. 25 shows a graph for describing the effects of the AMC table updating method of the present invention. The horizontal axis denotes the MCS value standardized by communication capacity and the vertical axis denotes the throughput (mean rate) standardized by communication capacity. The MCS value to be obtained with respect to the maximum throughput differs between a case in which there is a correlation among receiving antennas and a case in which there is no correlation among receiving antennas in each of the SM and STC modes. On the contrary, it could be understood that the present invention can control the MCS value so as to assure almost the maximum throughput as shown with circle and square symbols in FIG. 25.

As described above, there are two MIMO modes (SM and STC) used in the embodiment of the present invention. However, those modes may be replaced with other MIMO modes; for example, they may be a specific mode which maps signals in accordance with unique vectors of the subject channel matrix H, the STBC (Space-Time Block Code) transmission mode that realizes stable communications with use of four or more antennas. In addition to the MIMO transmission modes described above, the present invention can also apply widely to other transmission modes, in which the optimal MCS is not decided uniquely with respect to the CQI and the optimal MCS value varies among transmission environments. In other words, the communication modes are not limited only to the MIMO modes as described above; the present invention can also apply to other communications that employ the SISO (Single Input Single Output) mode, the SIMO (Single Input Multiple Output) mode, the MISO (Multiple Input Single Output mode, etc.

For example, even in case of the SISO (Single Input Single Output) transmission channel, the communication-enabled rate varies actually among the states of the subject delay wave. If there is almost no such delay wave, the optimal state is assumed to be a case in which the MCS in the AMC table becomes approximately equal to the mean rate. If an MCS value that is larger than the mean communication capacity is selected, it is regarded as an error almost in all cases and chain retransmission comes to occur. On the other hand, if there is a large delay wave, the communication-enabled rate is varied according to the intensity and phase of the delay wave. As a result, the MCS value updating amount table and the AMC table can be updated in steps shown in FIGS. 19 and 20 (20A, 20B, and 20C) and shown in FIG. 16B respectively, thereby a higher MCS value can be set within a range in which chain retransmission occurrence is prevented and a higher mean rate (throughput) can be assured.

The present invention is also effective for any communication systems that might be confronted with instantaneous interferences. For example, if packet communications are carried out for plural cells simultaneously and those communications come to interfere with each other, occurrence of such interferences from other cells is reduced in a region in which each cell has a high CQI value around its center. And the actual communication-enabled rate (communication capacity) can be judged roughly from the CQI notified from the receiver unit 4. Consequently, if an MCS value that is almost equal to a rate estimated from the CQI is selected, a higher mean rate (throughput) can be assured. On the other hand, the interference amount varies at the edge of each cell according to whether or not a packet is sent out from another cell. This is why the CQI notified from the receiver unit has a significant error and it does not necessarily correspond to the instantaneous communication capacity in actual communication. And this is why the communication is enabled at a certain probability even when the MCS is set higher than the mean rate according to the CQI and chain retransmission does not occur so often. And this is why the AMC table (FIG. 5) comes to be formed so that the MCS that is approximately equal to the mean rate is set with respect to the high CQI and the MCS that is slightly higher than the mean rate is set with respect to the low CQI due to the controlling of the updating procedures for the MCS value updating amount table shown in FIGS. 19 and 20 and the AMC table shown in FIG. 16B respectively. This means that a higher MCS can be set within a range in which chain retransmission occurrence is prevented, thereby a higher mean rate (throughput) is assured.

As described above, according to the present invention, the radio communication apparatus that can select a proper one of plural communication modes (MIMO communication modes) to make communications can update the reference (measured rate table) for selecting any one of plural modes (MIMO modes, etc.) and the reference (AMC table) for selecting a proper MCS so as to obtain a higher communication rate within a range in which chain retransmission occurrence is prevented, thereby enabling a higher throughput to be assured in communications even when the statistical channel characteristics are varied frequently.

What is claimed is:

1. A radio communication apparatus that makes communications by selecting a proper one of a plurality of encoding systems and a proper one of a plurality of modulating systems, respectively, the apparatus comprising:
a radio frequency circuit;
a demodulating/decoding section that demodulates/decodes a signal received by the radio frequency circuit;
an encoding/modulating section that encodes/modulates transmission data and outputs the result to the radio frequency circuit; and
a processing section that selects the encoding and modulating systems used in the encoding/modulating section according to a CQI (Channel Quality Information) value extracted from the received signal by the demodulating/decoding section and controls so that the encoding/modulating section encodes/modulates the transmission data according to the selected encoding and modulating systems,
wherein the processing section includes:
a measured rate table that stores a mean rate of each of a plurality of communication modes in accordance with the CQI value;
a communication mode deciding section that decides the communication mode so as to transmit the transmission data with reference to the measured rate table; and
an AMC table controlling section that refers to an AMC table that stores an MCS value for denoting each of the encoding and modulating systems in each of the plurality of communication modes in accordance with the CQI value to select proper encoding and modulating systems so as to transmit the transmission data according to the communication mode decided by the communication mode deciding section,
wherein the processing section updates the mean rate stored in the measured rate table and the MCS value stored in the AMC table corresponding to the current CQI value and CQI values in the neighborhood of the current CQI value, according to the result (success/failure) of the transmission and the transmission count of the transmission data, respectively.

2. The radio communication apparatus according to claim 1,
wherein the processing section further includes an MCS value updating amount table that stores an updating amount used to change the references for selecting the encoding and modulating systems properly according to a signal denoting the result (success/failure) of the transmission and the transmission count of the transmission data, extracted from the received signal by the demodulating/decoding section.

3. The radio communication apparatus according to claim 2,
wherein the MCS value updating amount table stores an amount used to change the MCS value so as to obtain a higher communication rate as the updating amount when the transmission data is transmitted successfully at the first transmission time.

4. The radio communication apparatus according to claim 3,
wherein the MCS value updating amount table stores an amount used to change the MCS value so as to obtain a lower communication rate as the updating amount when the transmission of the data fails by a plurality of times.

5. The radio communication apparatus according to claim 1, wherein the processing section updates the mean rate in the measured rate table when the data is received successfully or when the transmission count reaches a preset value.

* * * * *